United States Patent [19]
Meyer

[11] Patent Number: 6,157,943
[45] Date of Patent: Dec. 5, 2000

[54] INTERNET ACCESS TO A FACILITY MANAGEMENT SYSTEM

[75] Inventor: Sheri L. Meyer, Wauwatosa, Wis.

[73] Assignee: Johnson Controls Technology Company, Plymouth, Mich.

[21] Appl. No.: 09/190,696

[22] Filed: Nov. 12, 1998

[51] Int. Cl.[7] .................................................. G06F 13/00
[52] U.S. Cl. ................................................... 709/203
[58] Field of Search ................................. 709/200, 203, 709/222, 223, 224, 229; 359/111; 713/324; 707/203

[56] References Cited

U.S. PATENT DOCUMENTS

| | | | |
|---|---|---|---|
| 5,511,188 | 4/1996 | Pascucci et al. | 707/203 |
| 5,522,044 | 5/1996 | Pascucci et al. | 709/222 |
| 5,550,980 | 8/1996 | Pascucci et al. | 359/111 |
| 5,598,566 | 1/1997 | Pascucci et al. | 713/324 |

*Primary Examiner*—Robert B. Harrell
*Attorney, Agent, or Firm*—Quarles & Brady LLP; George E. Haas

[57] ABSTRACT

Information about a facilities management system for a building can be obtained by a remote computer accessing a Web server at the facilities management system via the Internet. The Web server employs a generic Web page layout and an active server pages program to create a Web page that displays information from the facilities management system. This mechanism does not require that the Web pages be custom developed for each particular building and its unique system configuration. Instead, the present invention provides dynamic Web page construction based on the number of items of data supplied by the facilities management system to the Web server. A authoring tool for custom Web page layout also is provided.

7 Claims, 3 Drawing Sheets

INTERNET ACCESS TO A FACILITY MANAGEMENT SYSTEM

BACKGROUND OF THE INVENTION

The present invention relates to controlling systems of a building, such as those which provide heating, ventilation, air conditioning, fire detection, and building access and security; and more particularly to a user interface to such facility management systems.

Large commercial and institutional buildings have several systems for controlling different aspects of the building operation. A heating, ventilation and air conditioning (HVAC) system manages components which control the interior environment of the building. A security system comprises devices which limit access to the building to only individuals who possess a proper access code or access device, such as a key card. A fire detection system utilizes heat and smoke detectors located throughout the building to sense the occurrence of a fire and produce a warning of that event. Other systems may monitor and control lighting and other electrical loads for optimum energy conservation.

These building systems may be autonomous or networked together in an integrated system. In either case, the systems are controlled by workstations at one or more locations within the building. Such workstations may be located at the manager's office, the building operating engineer's office, and the security desk. When the building is part of a larger commercial or educational campus, the systems and networks for each building can be connected to a wide area communication network, which enables control from a central campus facility management office.

Some companies may have a number of buildings located at different geographical locations in a metropolitan area or throughout a state or several contiguous states. In this situation, the owner or manager of these scattered buildings may desire to monitor and control the operation of each building from a central management office. This can be accomplished with standard telecommunication links between each building and the central management office. However, using conventional telecommunication carriers to provide links to each building becomes expensive and complex, especially where it is desirable to allow a access to each building from several other buildings in a large geographical area.

An obvious solution to this problem would be to provide Internet access to the facility management systems in each building with the appropriate password access protection. However, a drawback of Internet access is that because each building and its systems are unique, the Website and Web pages previously had to be custom developed for each building. Development of custom Websites requires special skills which typically are not possessed by building management personnel. Thus in order to provide Internet access, the building management must hire a Website designer and incur the costs of producing custom Websites for each facility which is to be accessed by the Internet.

SUMMARY OF THE INVENTION

A general object of the present invention is to provide access to facility management systems via the Internet.

Another object is to provide a generic Internet interface mechanism which does not require customization by the user for a particular building.

A further object of the present invention is to provide such an Internet access mechanism which obtains operational information automatically from the building management system and presents that information in an organized manner to the person accessing the system via the Internet. The mechanism creates the information presentation without being configured with details of the specific building design and building system configuration.

These and other objectives are satisfied by a method which comprises connecting a first computer to the facilities management system in a building and to a communication network, such as the Internet or an Intranet. The first computer executes a Web server program on the first computer to exchange messages over the communication network utilizing a Transport Control Protocol/Internet Protocol (TCP/IP).

A second computer is connected to the communication network at a location that is remote from the building. A standard, commercially available Web browser program is executed on the second computer to exchange messages over the communication network utilizing the TCP/IP. A request for information about the facilities management system is sent from the second computer to the first computer which responds by obtaining operational information from the facilities management system. The first computer executes an active server pages program to select predefined items of the operational information and create a Web page that contains the predefined items. The Webpage is transmitted to the second computer where it is displayed to the person who requested information about the facilities management system.

Another aspect of the present invention allows the user to select a location on the Webpage at which a desired piece of information is displayed. The second computer sends a designation of the selected location to the first computer which responds transmitting additional information about the desired piece of information.

A further aspect of the present invention enables floor plans and other building specific graphical information to be imported into the Internet Web site. This enables a Web page to be created which combines the graphical information with alphanumerical data regarding operating parameters of the building.

DETAILED DESCRIPTION OF THE INVENTION

Figure 1:
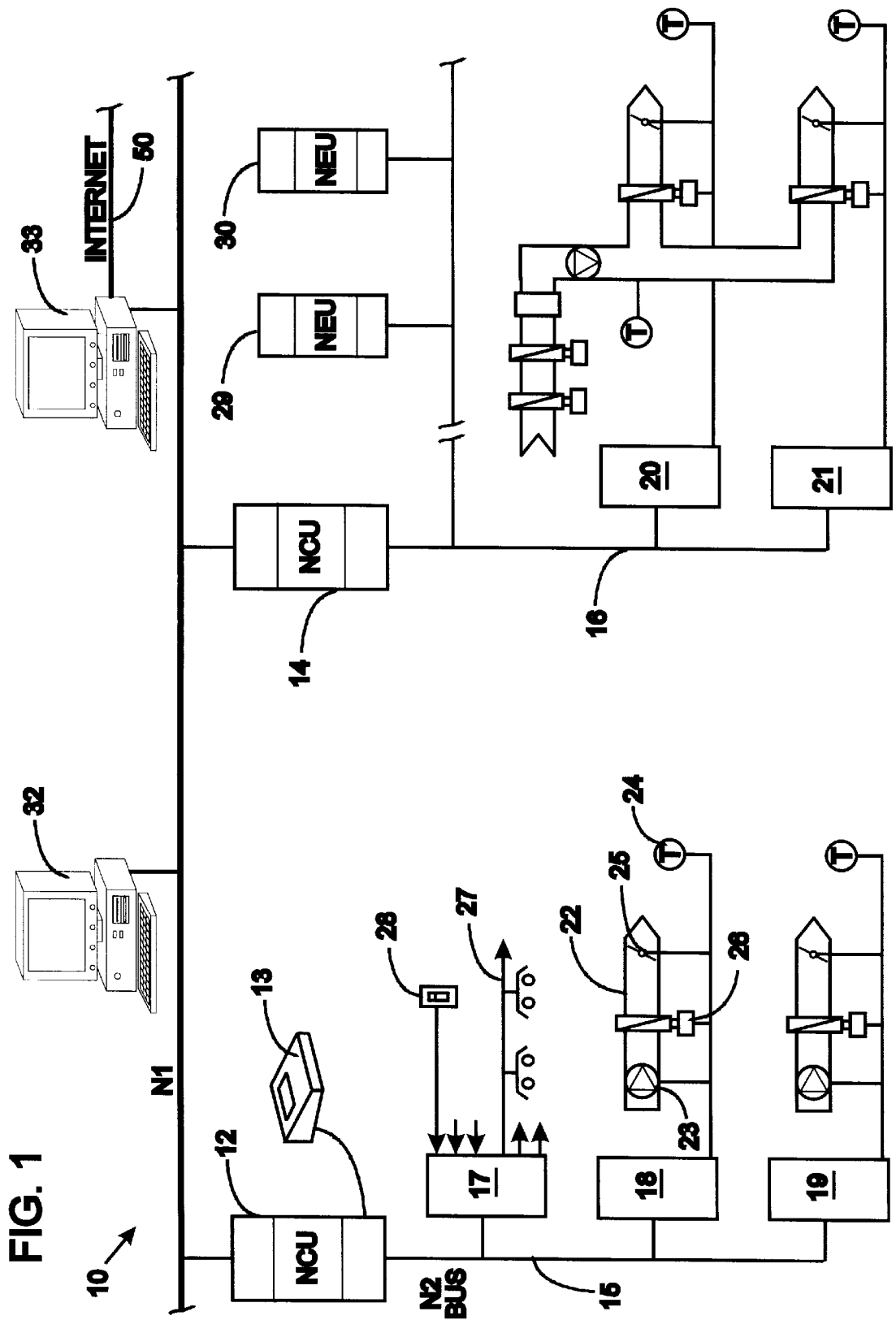
FIG. 1 is a block diagram of an exemplary facility management system for controlling heating, ventilation, air conditioning and lighting within a building.

FIG. 1 illustrates an example of a facility management system 10, such as one implemented using a Metasys® control system manufactured by Johnson Controls, Inc. of Milwaukee, Wis., U.S.A. This type of control system is described in detail in U.S. Pat. No. 5,511,188, which description is incorporated herein by reference. The facilities management system (FMS) 10 controls environmental systems such as HVAC and lighting within a building. Building security and fire detection systems also can be interfaced to the facilities management system 10.

A plurality of network control units 12 and 14 operate separate groups of environmental control subsystems and are connected to a high speed digital communication network N1. The network control units 12 and 14 execute specialized programs to maintain the environmental conditions governed by their respective subsystems according to programmed parameters. An optional local input/output (I/O) panel 13 allows a user to monitor and control the functions of the network control unit 12 via a standard RS-232 interface. The network control units 12 and 14 also perform numerous background tasks to assure that each of the nodes of the N1 network is operating with the same set of global variables, is time synchronized, and has consistent directories of system names and configuration data.

The environmental subsystems in turn are governed by separate digital control modules 17, 18, 19, 20 and 21 which are connected to one of the numerical control units 12 or 14 by an N2 bus 15 or 16. The digital control modules 17–21 interface with sensors, actuators and other devices of the respective subsystem. Depending upon the type of subsystem being controlled, the digital control modules 17–21 may receive signals from pressure/electric transducers, binary input contacts, differential pressure inputs and binary frequency inputs. Typical actuators and outputs of a subsystem include analog devices, solenoids, relays, motor controllers, indicator lights and annunciators.

In the exemplary facility management system 10, a first digital control module 17 operates lighting within an area of the building. A plurality of light circuits 27 are connected to relay outputs of the digital control module 17, which also receives input signals from manual room light switches 28. The second digital control module 18 operates a conventional variable air volume (VAV) unit 22 of the building HVAC system and receives input signals from an airflow sensor 23 and a thermostat 24 within the room supplied by the VAV unit. In response to these input signals and control commands from the N2 bus, second digital control module 18 operates electrical actuators of a variable damper 25 and a chiller coil valve 26.

The second network control unit 14 has expanded capacity and range due to connection of two remote network expansion units 29 and 30 to N2 bus 16. This eliminates the necessity of wiring the AC line voltage for separate devices back to the network control unit 14.

A primary operator workstation 32, such as a personal computer, is connected to the N1 network to communicate with the network control units 12 and 14. The primary workstation 32 executes a supervisory control program which gathers status data regarding the operation of components of the facilities management system 10 and responds to user inputs by issuing commands that govern system operation. Primary workstation 32 also stores information regarding the configuration of the facilities management system 10 and operational data associated with each level of the system organization.

Figure 2:
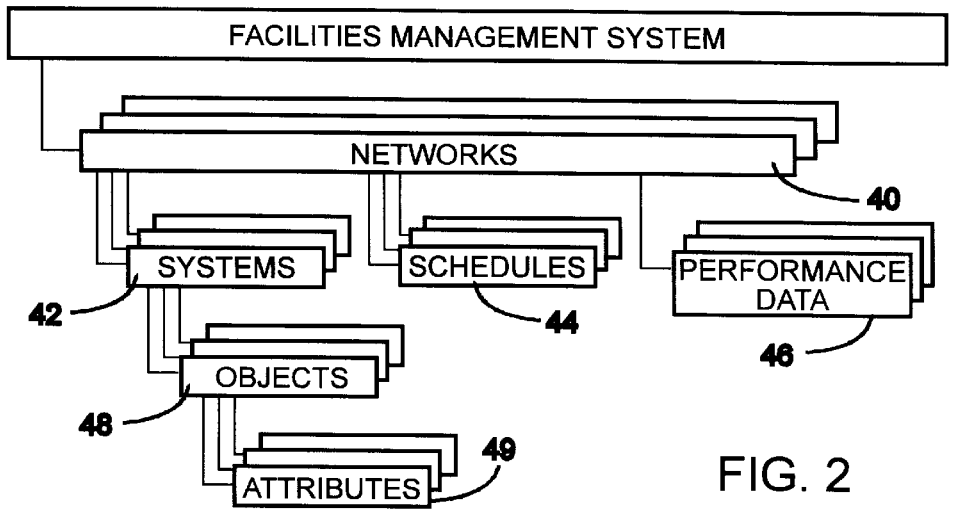
FIG. 2 depicts a functional organization of components and data files for the facility management system.

FIG. 2 depicts the functional organization of information regarding the facilities management system 10. This functional organization may or may not correspond to the physical organization of the hardware components of the system. For example, several subsystems in the same area of a building may be functionally grouped together even though the subsystems are physically connected to different network control units 12 and 14. Beneath the network functional level 40 is a level containing information regarding the different systems 42, operating schedules 44 and a database of performance data 46. As will be understood by control engineers, the systems 42 are further subdivided into objects 48 which possess one or more attributes 49 that define the operational parameters of the particular object.

Referring again to FIG. 1, a secondary workstation 33 is connected to the N1 network in order to access system configuration information stored in primary workstation 32. The operation of the facilities management system 10 also can be supervised from the secondary workstation 33. In addition, the secondary workstation 33 is connected to the Internet 50 and executes software which implements a facilities management system Website on the Internet. Alternatively, this external connection can be to an Intranet for an educational institution, thus enabling centralized control of several buildings on a campus.

Figure 3:
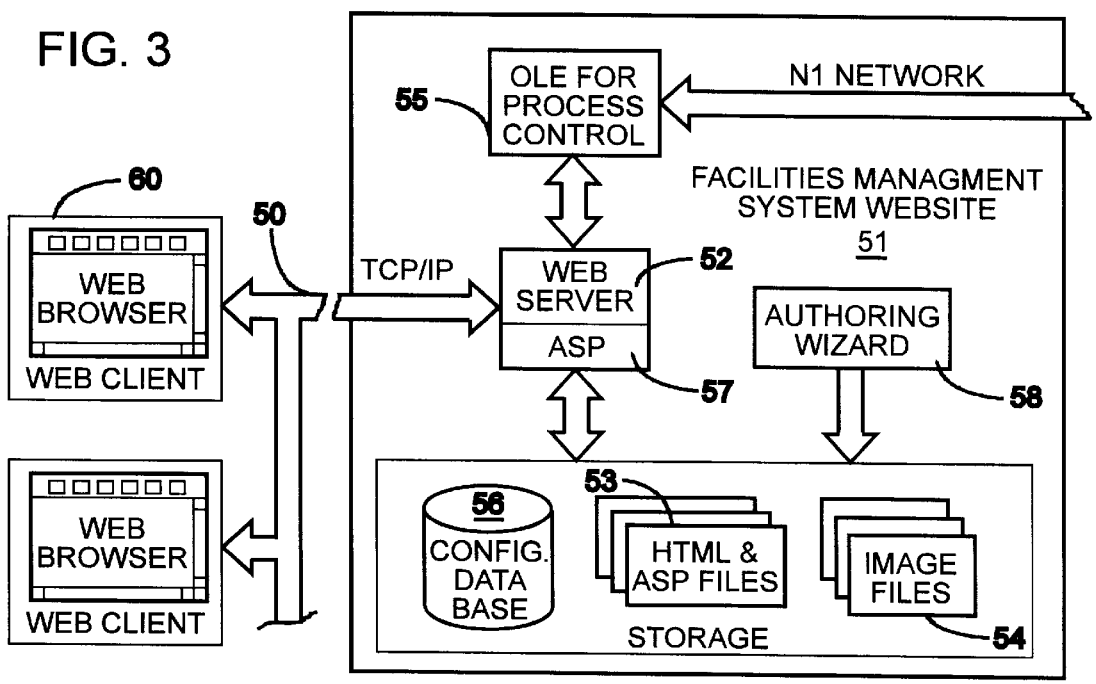
FIG. 3 is a block diagram of software which implements an Internet Web site on a workstation connected to the facility management system.

FIG. 3 depicts the different items of software that are loaded on the secondary workstation 33 to implement the Website 51. A conventional Web server program 52 handles the exchange of information over the Internet 50 via the standard Transport Control Protocol/Internet Protocol (TCP/IP). The Web server 52 in turn is coupled to the N1 network by a conventional communication Object Linking and Embedding (OLE) 55 having software interfaces based on a process control industry standard. Alternatively, a interface program using a proprietary process control protocol for the specific HVAC network could be employed. The Web server 52 also implements an Active Server Pages (ASP) application 57, available from available from Microsoft Corporation of Redmond, Wash. U.S.A. Active Server Pages allow the Web server to obtain building specific data from the primary workstation 32 and display that information as a Web page without utilizing Web pages that have been specifically designed for the particular building configuration and types of system information. The Website 51 stores a plurality of files such as HTML and ASP files 53, image files 54, and Web site configuration data 56.

A remote user, desiring access the facilities management system 10, employs a standard, commercially available Web browser 60 on a personal computer to address the Website 51 via the Internet. It should be noted that multiple Web browsers can access the facilities management system 10 simultaneously. Upon receiving the request, Website 51 responds by sending a home page through the Internet 50 to the requesting Web browser 60. This home page, stored in the HTML files 53, contains identification of the Website and provides areas for the user to enter an access name and password. The entered information is sent back to the Website 51, which verifies that the user is authorized to access the facilities management system based on a list of authorized users and their passwords in the configuration data 56. Additional levels of security may be provided to further inhibit hackers from accessing the Website and the FMS 10. A determination also is made, based on the configuration data 56, whether this particular user is authorized for read-only or command level access. Read-only access, as the name implies, allows the user to obtain information about the operation of the facilities management system 10 and the environmental conditions of the building, but not alter the system operation, which is limited to those individuals with command access authority.

Once the user's access authority has been determined, the Website 51 transmits a menu page to the accessing Web browser 60 requesting that the user select between a Network Map View and a Graphical Hierarchy View. The Network Map View allows the user to step through the levels of the functional organization of the facilities management system 10 (FIG. 2). At each level the Active Server Page (ASP) component 57 of the Web server 52 automatically reads and displays information for that level in a table format. The Graphical Hierarchy View permits the user to navigate through the different levels of a graphical depiction of the building while viewing environmental parameters for the depicted areas.

If the user selects the Network Map View mode, the Web server 52 and specifically the active server page component 57 notifies the OLE for Process Control program 55 to request operational information form the facilities management system 10. This causes a request to be sent over the N1 network to the component of the facilities management system 10 which contains the system information, in this example the primary workstation 32. In response to the initial request network level 40 information (FIG. 2) is transferred from the primary workstation 32 to the Website in the secondary workstation 33.

Next the Web server 52 creates a Web page containing the information for the network level 40. Specifically, the Active Server Pages component 57 obtains a generic network page format from the HTML files 53 and displays the network data as a table on that page. Each line of the display has a predefined format while the number of lines and the content of each line is dependent upon the network configuration received from the primary workstation 32. For example, if the facilities management system 10 is for a single building there may be only one network, whereas for a campus system there may be a separate network for each building. The Website 51 does not have to be customized to display the exact number of networks for this installation. Instead the Active Server Pages component 57 determines the number of networks and the name of each network from the configuration data received from the primary workstation and forms the network Webpage as a listing of the network names with a hot spot defined around each item in the listing. The completed Web page is transmitted by the Website 51 to the requesting Web browser 60 via the Internet 50.

Upon being displayed on the Web browser, the user can click on a hot spot associated with a particular network that is desired to be viewed in greater detail. A designation of the selected network is then sent from the Web browser 60 to the Website 51 to which the Web server 52. The Web server 52 responds by requesting information about the systems in the selected network from the primary workstation 32 and upon receiving that information creates another Webpage listing the network systems in the same manner that the network Web page was formed as described previously.

Figure 4:
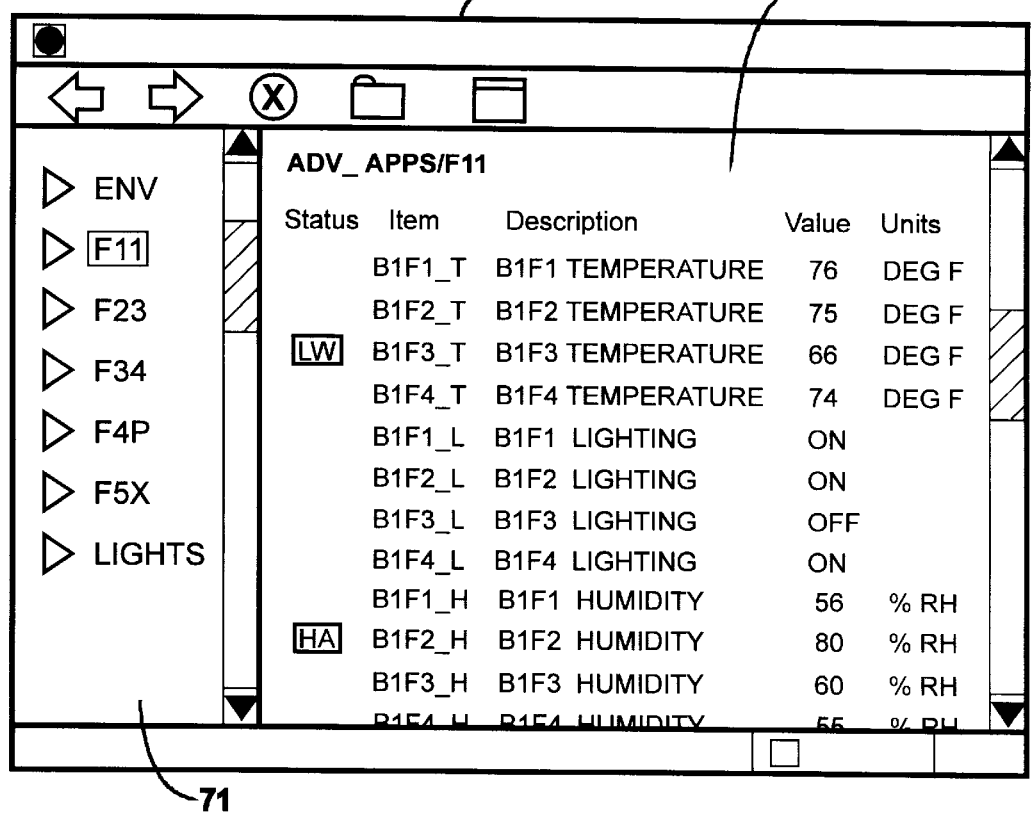
FIG. 4 depicts a Web page displaying exemplary data from the facility management system.

The exemplary Web page 70 shown in FIG. 4 has a frame 71 at the left side which contains a listing of the systems of the previously selected network. The displayed names are hyperlinks to data files for each system and clicking on a specific name (e.g. F11) causes the operational information for the objects of that system to be displayed in a frame 72 on the right side of the display. Vertical scroll bars at the right edge of each frame can be utilized to scroll up and down the list of systems and objects.

For example, when the user clicks on system name F11 and that designation is relayed to the Web site 51, the secondary workstation 33 requests information about the objects for that system from the primary workstation 32. Upon receiving the requested information, the Active Server Pages component 57 selects relevant items of that information, as specified in the generic display line format for the object Web page stored in the HTML and ASP files 53. The resultant Webpage created by the ASP component 57 contains an objects frame 72 which displays all of the online facility management system objects within the selected system. As for the display of other information levels, the pages of the Web server 52 do not have to be customized to display the precise number of objects for each system, nor set-up for the specific types of objects in the selected system. Instead the Active Server Pages component 57 determines the number of objects and thus the number of lines for the Web page from the data received from the primary workstation 32. By using Active Server Pages the Web site 51 does not have to store custom designed Web pages for this particular building and each level of operational information, as the Webpage is dynamically formatted in response to the specific information sent by the primary workstation 32.

FIG. 4 displays exemplary objects for system F11 which corresponds to part of a building floor having a number of zones with separate temperature and humidity sensors, as well as lighting controls. The displayed information for each object includes its status, item name, description, present value, and the units of measurement for that value. For example, object B1F1_T is a temperature sensor in a building area designated B1F1 and has a present reading of 76° F. Similarly object B1F1_H is a humidity sensor within area B1F1 and indicates 56% relative humidity. The system display in frame 72 also shows that the lighting in area B1F1 is on.

The status column in the object frame 72 indicates whether the particular object is in an alarm condition, a warning state, or is off line. Note that the temperature for area B1F3 is 66° F. producing a low warning status indication. Similarly, the 80% humidity for area B1F2 produces a high alarm status. The set points for the high and low warning and alarm conditions for each object are configured into the facilities management system and stored in the primary workstation 32.

Referring again to FIG. 3, the user can use a computer mouse to move the cursor on the Web browser screen to the display line for a particular object (highlighting that line) and then by clicking the mouse button, a signal is sent to the Web page. In response, the Web page inserts a pop-up menu of options for that object into the Web page which then visible in the Web browser 60. The typical initial pop-up menu enables the user to select among the functions of entering a command function, displaying a programmed operating schedule for the object or displaying historical object performance data.

If the command function is chosen, the Web server 52 responds upon receiving that selection by creating a new Web page which allows the user to alter the operating set point value for the associated object. For example, the user can change the desired temperature setting for a room or turn the room lights on or off. This is accomplished by displaying a command Web page on the Web browser 60 and the user entering the change using the mouse or keyboard. When the Web server 52 receives the desired change, a command is sent via the OLE for Process Control 55 to the facilities management system 10 in a similar manner as though the change was entered into the keyboard of the secondary workstation 33.

The user also is able to request that performance data be displayed for the selected object. One form of such data is a "point history" of periodic readings of the object values which are presented as a table on the right frame of the Web page. Another type of object information is totalized data, such as the number of times a light is turned on or off during a day. The facility management schedule for this object, e.g. the programmed times at which the lights are to be turned on or off or at which the temperature is raised or lowered, also can be displayed in the right frame of the display.

The presentation shown in FIG. 4 is a Network Map View which is constructed automatically by the Active Server Pages component 57 of the Web server 52. This type of presentation does not require that the Website 51 be configured with custom pages for the particular building. Instead, the Web server software provides generic pages within the HTML and ASP files 53 with the active server pager module obtaining the specific building from the facility management system and formatting that for the Web page display.

As an alternative, the user is able to select the Graphical Hierarchy View mode in which custom Web pages may be developed for the specific building. For this purpose an authoring wizard 58 program is provided within the Website 51 as shown in FIG. 3. This permits graphics, such as a building floor plan or an isometric rendering of a building area, to be imported from other program files, for example an architectural drafting program. The user then may overlay selected objects from the specific facility management system 10 onto the imported graphics to define "hot spots" at desired locations which enable movement to the next level of the hierarchy. The resultant graphics are stored in the image files 54 of the Website 51.

Figure 5:
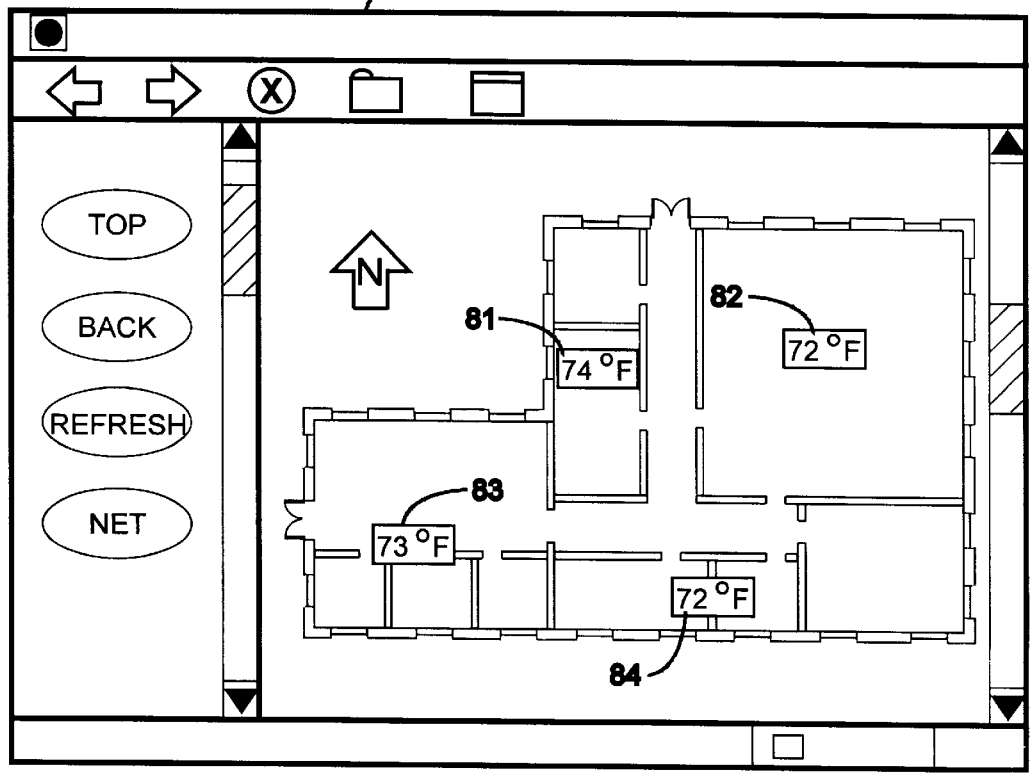
FIG. 5 shows a Web page which depicts a graphical view of the facility management system, in this case a building floor plan.

The graphical levels may consist of an elevation view of the building, plans for each building floor, and enlarged representations of sections of each floor. To navigate through the graphical hierarchy, the user clicks a section of the presently displayed building graphic and the next level for that section is displayed. For example, clicking in a room of the entire floor plan will display an enlarged plan of that floor area along with alphanumerical data showing the temperature, humidity and lighting conditions for rooms in that areas. FIG. 5 shows a floor plan presented on a Web page 80 with defined hot spots 81–84 containing operational information (e.g. temperatures) for different regions of the represented building floor. By clicking on one of the hot spots 81–84, the corresponding region can be magnified with additional facility management information appearing for each of the objects within that region.

What is claimed is:

1. A method for accessing a facilities management system comprising steps of:

connecting a first computer to the facilities management system and to a communication network;

executing a Web server program on the first computer to exchange messages over the communication network utilizing a Transport Control Protocol/Internet Protocol (TCP/IP);

connecting a second computer to the communication network;

executing a Web browser program on the second computer to exchange messages over the communication network utilizing the TCP/IP;

sending a request for information about the facilities management system from the second computer to the first computer;

the first computer responding to receipt of the request by obtaining operational information from the facilities management system;

the first computer executing an active server pages program to select predefined items of the operational information and create a Web page that contains the predefined items;

transmitting the Webpage to the second computer; and displaying the Webpage at the second computer.

2. The method as recited in claim 1 further comprising storing in the first computer a Web page layout having a predefined format of classes of information; and wherein the Web page layout is utilized by the active server pages program to create the Web page.

3. The method as recited in claim 2 wherein the step of executing an active server pages program to select predefined items utilizing the classes of information of the predefined format specify which items of information obtained from the facilities management system are to be used to create the Web page.

4. The method as recited in claim 2 wherein the step of obtaining operational information utilizes an Object Linking and Embedding for Process Control program to obtain information from the facilities management system.

5. The method as recited in claim 1 further comprising:

selecting a location on the Webpage display on the second computer;

the second computer sending a designation of the location selected to the first computer;

the first computer responding to the designation by forming a Webpage with additional information about the facilities management system.

6. A method for accessing a facilities management system which includes a plurality of devices, the method comprising steps of:

connecting a first computer to the facilities management system and to the Internet;

storing, in the first computer, a Web page layout having a predefined line format comprising areas for different predefined classes of information;

executing a Web server program on the first computer to exchange messages over the Internet;

connecting a second computer to the Internet;

executing a Web browser program on the second computer to exchange messages over the Internet;

sending a request for information about the facilities management system from the second computer to the first computer;

the first computer responding to receipt of the request by obtaining operational information regarding the plurality of devices from the facilities management system;

the first computer executing an active server pages program which utilizes the Web page layout to create a Web page that contains a display line for each of the plurality of devices, wherein each display line is formed by selecting the different predefined classes of information about one of the plurality of devices;

transmitting the Webpage to the second computer; and displaying the Webpage at the second computer.

7. The method as recited in claim 6 further comprising:

selecting a location on the Webpage display on the second computer;

the second computer sending a designation of the location selected to the first computer;

the first computer responding to the designation by forming a Webpage with additional information about the facilities management system.

* * * * *